(12) United States Patent
Micucci, Jr.

(10) Patent No.: US 11,358,169 B2
(45) Date of Patent: Jun. 14, 2022

(54) AUTOMATED SYSTEM FOR APPLYING COATING TO A SURFACE

(71) Applicant: Raymond Micucci, Jr., Poughkeepsie, NY (US)

(72) Inventor: Raymond Micucci, Jr., Poughkeepsie, NY (US)

( * ) Notice: Subject to any disclaimer, the term of this patent is extended or adjusted under 35 U.S.C. 154(b) by 106 days.

(21) Appl. No.: 16/551,438

(22) Filed: Aug. 26, 2019

(65) Prior Publication Data

US 2019/0374967 A1   Dec. 12, 2019

(51) Int. Cl.
| | | |
|---|---|---|
| *B05B 13/04* | (2006.01) |
| *B05D 1/02* | (2006.01) |
| *B25J 11/00* | (2006.01) |
| *B25J 15/00* | (2006.01) |

(52) U.S. Cl.
CPC ............ *B05B 13/0431* (2013.01); *B05D 1/02* (2013.01); *B25J 11/0075* (2013.01); *B25J 15/0019* (2013.01)

(58) Field of Classification Search
CPC ..... B05B 13/0431; B05B 13/005; B05D 1/02; B25J 11/0075; B25J 15/0019
See application file for complete search history.

(56) References Cited

U.S. PATENT DOCUMENTS

| | | | | |
|---|---|---|---|---|
| 5,333,969 | A * | 8/1994 | Blaha | E01C 19/46 404/102 |
| 5,854,190 | A * | 12/1998 | Knipe, Jr. | B08B 9/00 510/241 |
| 6,507,163 | B1 * | 1/2003 | Allen | B25J 9/162 14/78 |
| 10,253,462 | B1 * | 4/2019 | Raman | E01D 22/00 |
| 2005/0196543 | A1 * | 9/2005 | Morton | B63B 59/00 427/421.1 |
| 2007/0037484 | A1 * | 2/2007 | Ohishi | E01H 1/005 451/5 |
| 2010/0160592 | A1 * | 6/2010 | Brown | C08G 18/3228 528/68 |
| 2013/0011234 | A1 * | 1/2013 | Pretlove | B25J 5/005 414/749.1 |
| 2015/0275666 | A1 * | 10/2015 | Tschumi | E21D 11/105 427/10 |
| 2016/0138228 | A1 * | 5/2016 | Rainwater | E01C 19/176 404/111 |
| 2019/0234029 | A1 * | 8/2019 | Raman | B66F 7/00 |

* cited by examiner

*Primary Examiner* — Alexander M Weddle
(74) *Attorney, Agent, or Firm* — Barry Choobin; Patent 360

(57) ABSTRACT

The present invention is directed to an automated system for applying coatings to big structures, such as bridges. The automated system comprises a robot coupled to a railing and the railing in turn operably coupled to a mobile platform. At least one nozzle is configured in the robot which is connected to a proportioner via a hose. A computing unit controls the robot and the proportioner for applying desired coating patterns.

9 Claims, 3 Drawing Sheets

AUTOMATED SYSTEM FOR APPLYING COATING TO A SURFACE

FIELD OF INVENTION

The present invention relates to a robotic system, more particularly relates to vehicle based robotic system for applying a coating to a surface.

BACKGROUND

Objects are protected from external damaging factors, such as water by applying a protective coating to the surface of the objects. For example, metal susceptible to corrosion are protecting by applying a waterproof coating over the surface of the metal. The waterproof coating acts as a barrier between the object and corroding substances. Besides protecting an object from corrosion, coatings also enhance the aesthetic appearance of the object. For example, bridges and high-rise building have coatings on the surface to provide both protection against external corroding factors and aesthetic appearance.

The coatings are generally applied in the form of multiple layers to provide adequate protection. The first layer is a primer layer that enhances the bond between the upper coating layers and the object surface. Thereafter one or more layers of coating are applied over the primer layer. Coatings are generally applied over a surface by a human using an applicator or sprayed over a surface using a spray gun driven by a carrier gas.

Applying coatings over huge surfaces such as bridge decks, railings by human workers is both time consuming and costly. Thus, a need is appreciated for an automated system for applying a coating to big structures, such as bridge decks.

SUMMARY OF THE INVENTION

Therefore, the principal object of the present invention is providing a fast way for applying protective coatings to big structures.

An additional object of the present invention is that system according to the present invention is economic in use.

Yet another objective of the present invention is that the system provides uniform coating over objects.

BRIEF DESCRIPTION OF THE DRAWINGS

The accompanying figures, which are incorporated herein, form part of the specification and illustrate embodiments of the present invention. Together with the description, the figures further serve to explain the principles of the present invention and to enable a person skilled in the relevant arts to make and use the invention.

DETAILED DESCRIPTION

Figure 1:
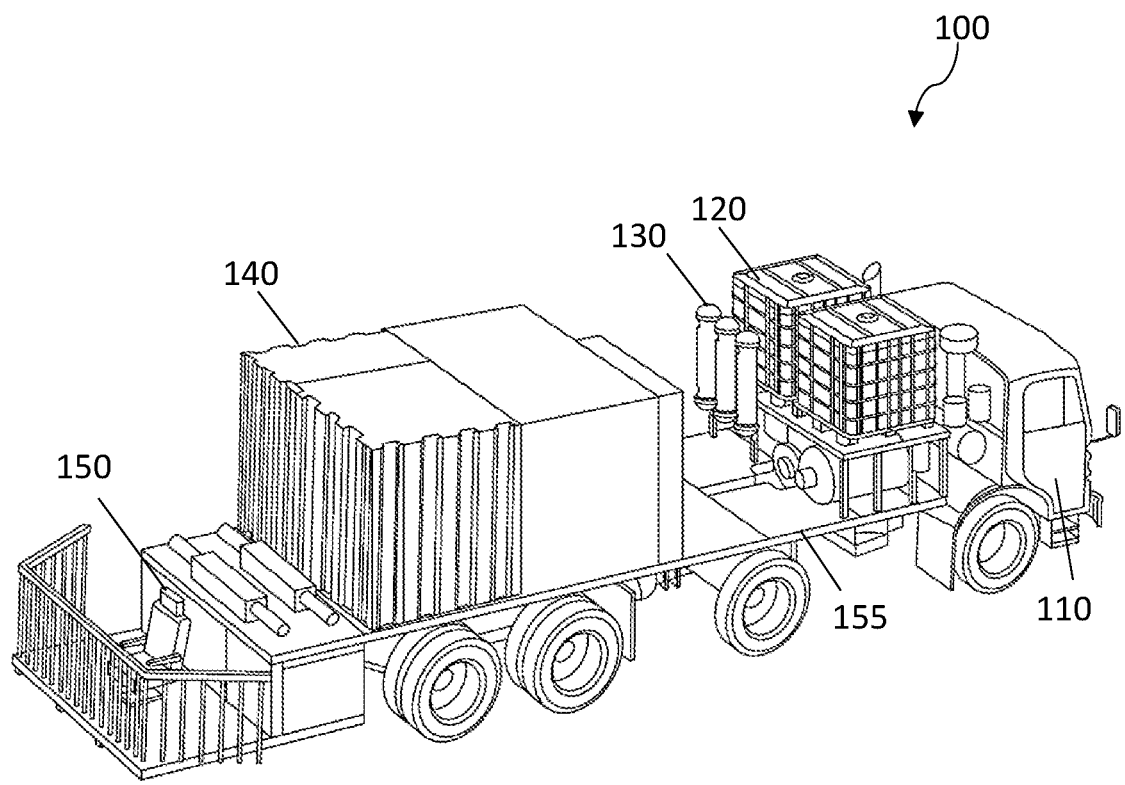
FIG. 1 shows the robotic system including a trailer with a bed, the tanks on a proximal end of the bed, a container on a distal end of the bed, and an operator seat attached to the distal end of the bed, according to an embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The present invention is generally directed to a system and method for applying protecting coatings over big structures, such as a bridge deck. The system in accordance with the present invention is a robotic system that can precisely and uniformly apply protective coatings on a big structure in a short time and efficiently. The system comprises a mobile platform, a shaft operably coupled to the mobile platform, and a robot operably coupled to the shaft. The mobile platform in an exemplary embodiment can be a truck, trailer or a cart. The mobile platform can be driven or pulled across the big structure while the robot applying coating to the big structure. The robot is equipped with a multi-head spray gun. The spray gun comprises a nozzle attached via a hose to high-pressure impingement metering equipment. The nozzle is configured in the robot. The tanks containing the coating materials and the high-pressure impingement metering equipment could be carried on the mobile platform. The size and capacity of the spray gun can be varied based on the object to be coated.

The system in accordance with the present invention is particularly useful in construction and public safety industries which always looks for means to increase the quality control and reduce the mobilization times on bridges. Protective coatings help to increase the longevity of a bridge, and the present invention permits fast and uniform application of protective coatings on big structures, thus saving both time and money. The fully automated system ensures that the completion of big structures is timely and with full quality control. The fully automated system including the impingement blending of chemical components under high pressure can maintain ratio accuracy and reduce waste. The system can handle all types of coats including the base coat and the multiple topcoats. The robot is configured to uniformly applying a coating to all sides of an object. The operation of the shaft and metering equipment and the robot can be controlled by a controlling unit. The controlling unit helps to make the whole process of applying the coating to a big structure automated. Moreover, the coating process including the thickness of the coating layer can be configured into the controlling unit. The controlling unit can be implemented as a computing device.

The spray gun having application mechanism of different types can be selectively and replaceably mounted depending upon conditions of a paint coating operation required. Multi-head spray gut can be configured depending upon conditions of coating operation, such as the shape of a coating surface, nature of paint, properties of the solvent, etc. The spray gun is usually driven by a carrier gas. Furthermore, the head of the spray gun can be configured with suitable atomizers. Alternatively, is also known a method of enhancing the efficiency of paint deposition on a an object, wherein a high voltage is applied to the head of the spray gun by the use of a high voltage generator, letting charged paint particles sprayed by the spray gun fly along an electrostatic field which is formed toward the object which is retained at the earth potential. Other examples of spray device include air gun sprayers, high volume low-pressure spray, low volume low-pressure spray, airless spray gun.

One or more tanks are used to store and supply the coating materials and solvents. These tanks can be loaded on the mobile platform itself. These can be connected to proportioner through hoses. The capacity of the tanks could be such that may allow at least a single coating on the big structure without refilling the tank. However, the size of the tank may also vary with the size of the mobile platform that has to accommodate the tank. Anyhow, sensors can be used to automatically detect the levels of coating materials and solvent. This will ensure that the fully automated system according to the present invention works properly.

The robot includes a body, arm and an effector. The effector is configured with a spray device or other tools involved in coating and smoothening a surface. The body and arm are housed in a housing, wherein the housing protects the robot from the harsh external environment. For example, the housing shall protect the robot from rains, dust and any external impact. The robot can be made of any suitable rigid material, known to be used in making industrial robots. The robot has multiple axes of movements and can be driven by electric motors. Also, sensors can be provided to detect the environment, the coating process and the thickness of the coating. One or more cameras can also be used to remotely and in real-time monitor the coating process and for quality control.

To power the robot, proportioner, and the controlling unit, suitable electricity generators that produce electricity from the fuel can be deployed. Such a power source can be accommodated in the mobile platform. Alternatively, batteries can also be used to power the components of the present invention. The choice of power source will be governed by the power load and availability.

In the case, the robot has a reciprocating operation for applying coatings to a surface. The reciprocating robot can be configured for providing the desired thickness of the coating. The method of this invention preferably utilizes the impingement mixing and reciprocal spray bot action. The aggregate coating can also be optionally provided. An aggregate dispensing bar fix coupled to an aggregate bin as self-propel for dispensing the aggregate. Using the method of this invention, the process proportioning and application of the waterproofing coating, fully automated, thereby reduces the amount of labor required to apply the system to the bridge surfaces. A further advantage of the present invention is the increased safety benefit to the workers in applying spray coatings to big structures.

Figure 2:
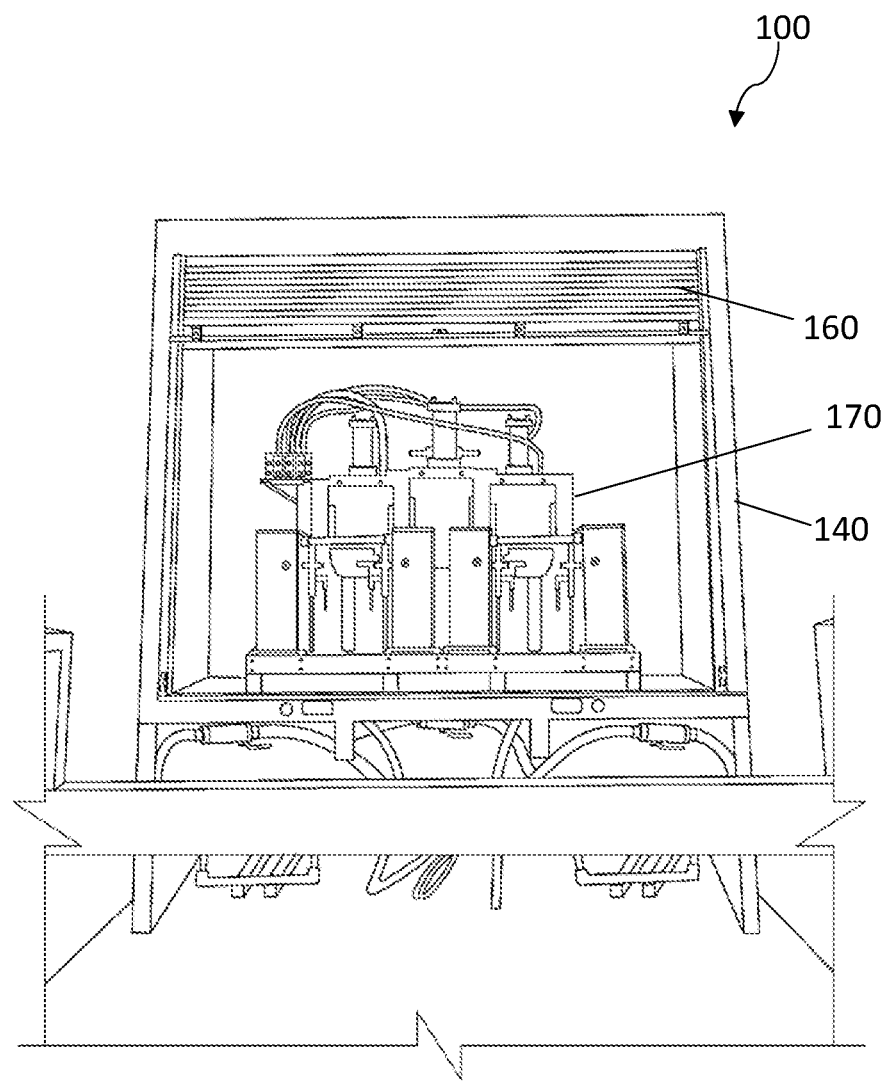
FIG. 2 is a rear view showing a closing shutter of the container and a robot housed in the container, according to another embodiment of the present invention.
Figure 3:
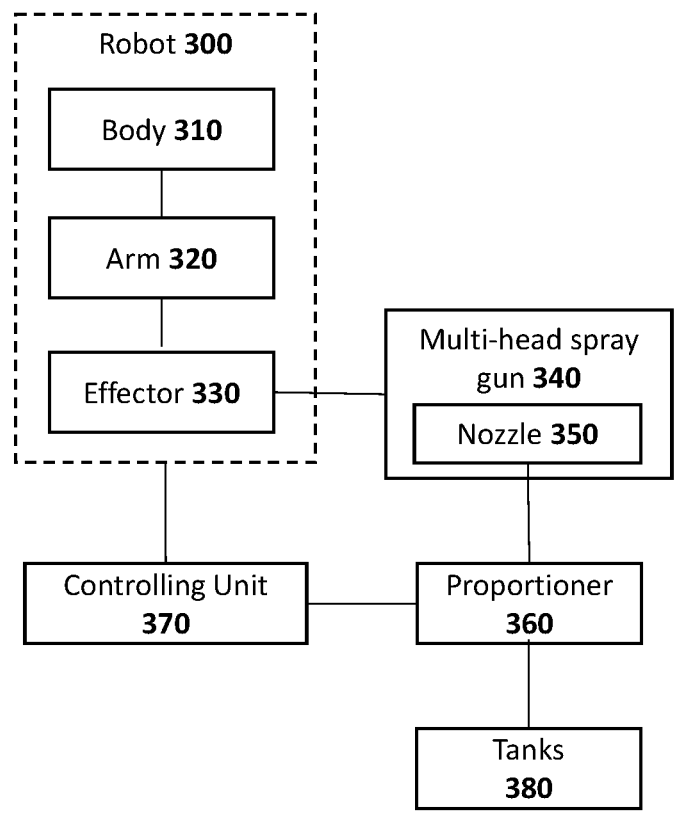
FIG. 3 is a block diagram showing an exemplary embodiment of the robotic system, according to the present invention.

Now referring to the FIGS. 1 & 2, the FIG. 1 shows a perspective view of the robotic system 100 in accordance with an embodiment of the present invention. The FIG. 1 shows a trailer 110 having a driver cabin and a storage area of rear side. The trailer 110 has a bed 155, the bed 155 has a proximal end and a distal end. The storage area has solvent and coating storage tanks 120 coupled to a proportioner 130. The storage tanks 120 can be seen mounted on the proximal end of the bed 155. Further can be seen in FIG. 1 is a container 140 mounted on the distal end of the bed 155, and an operator seat 150. FIG. 2 is a rear view of the trailer 110 showing a closing shutter 160 of the container 140. The container 140 is in open state and can be seen is a robot 170 housed in the container 140. The robot 170 is in fluid communication with the proportioners 130 through fluid conduits. Referring to FIG. 3 which shows a robot 300, the robot 300 has a body 310, an arm 320, and an effector 330. A multi-head spray gun 340 with a nozzle 350 coupled to the robot 300. A controlling unit 370 operably coupled to the robot 300 and a proportioner 360. The proportioner is connected to tanks 380.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A robotic system for applying a coating to a bridge deck comprising:
   a mobile platform, the mobile platform comprises a bed, the bed has a proximal end and a distal end;
   a container mounted on the distal end of the bed, the container has a shutter, the shutter configured to switch between an open state and a closed state;
   a robot housed in the container, the robot comprising a body, an arm, and an effector, the robot further comprises sensors configured to monitor a coating process and a thickness of a coating;
   a multi-head spray gun coupled to the effector of the robot, the multi-head spray gun comprises a nozzle connected to a proportioner through a hose;
   a plurality of tanks mounted on the proximal end of the bed, the plurality of tanks configured to contain coating materials, the plurality of tanks in fluid communication with the proportioner, one or more sensors configured to detect a level of the coating materials in one or more of the plurality of tanks; and a base coupled on a rear side of the mobile platform and adjacent to the distal end of the bed, the base is at a height substantially less than a height of the bed above ground, an operator seat is mounted on the base such that a height of a seat of the operator seat is substantially less than the height of the bed above the ground.

2. The robotic system of claim 1, wherein the proportioner is a high-pressure impingement metering equipment.

3. The robotic system of claim 1, wherein the mobile platform is a truck.

4. The robotic system of claim 1, wherein the mobile platform is a trailer.

5. The robotic system of claim 1, wherein a driver cabin of the mobile platform is coupled to the proximal end of the bed, the mobile platform is a truck or a trailer.

6. The robotic system of claim 1, wherein the robotic system further comprises one or more cameras configured to capture the applying of coating on the bridge deck.

7. A method for automated coating a bridge deck, the method comprising the steps of:
providing a robotic system, the robotic system comprising:
a mobile platform, the mobile platform comprises a bed, the bed has a proximal end and a distal end,
a container mounted on the distal end of the bed, the container has a shutter, the shutter configured to switch between an open state and a closed state,
a robot housed in the container, the robot comprising a body, an arm, and an effector, the robot further comprises sensors configured to monitor a coating process and a thickness of a coating,
a multi-head spray gun coupled to the effector of the robot, the multi-head spray gun comprises a nozzle connected to a proportioner through a hose,
a plurality of tanks mounted on the proximal end of the bed, the plurality of tanks configured to contain coating materials, the plurality of tanks in fluid communication with the proportioner, one or more sensors configured to detect a level of the coating materials in one or more of the plurality of tanks,
a controlling unit operably connected to the robot and the proportioner for automated control, the controlling unit configured to receive the thickness of the coating, and receive the coating process, and
a base coupled on a rear side of the mobile platform and adjacent to the distal end of the bed, the base is at a height substantially less than a height of the bed above ground, an operator seat is mounted on the base such that a height of a seat of the operator seat is substantially less than the height of the bed above the ground; and
automated coating of the bridge deck, by the robotic system, controlled by the controlling unit based on the received thickness of the coating and the coating process, wherein the coating is monitored by the sensors of the robot.

8. The method of claim 7, wherein a driver cabin of the mobile platform is coupled to the proximal end of the bed, the mobile platform is a truck or a trailer.

9. The method of claim 7, wherein the robotic system further comprises one or more cameras configured to capture the applying of coating on the bridge deck, wherein the method further comprises the steps of:
remotely monitoring the applying of coating.

* * * * *